Aug. 16, 1949.     T. ALGER     2,479,147
SAW CLAMP
Filed March 22, 1948
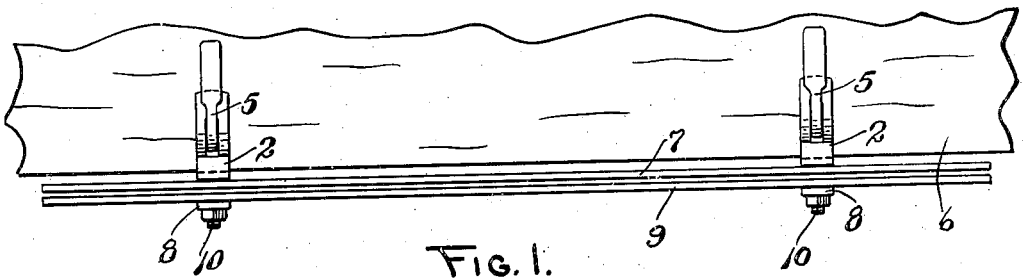
FIG. 1.
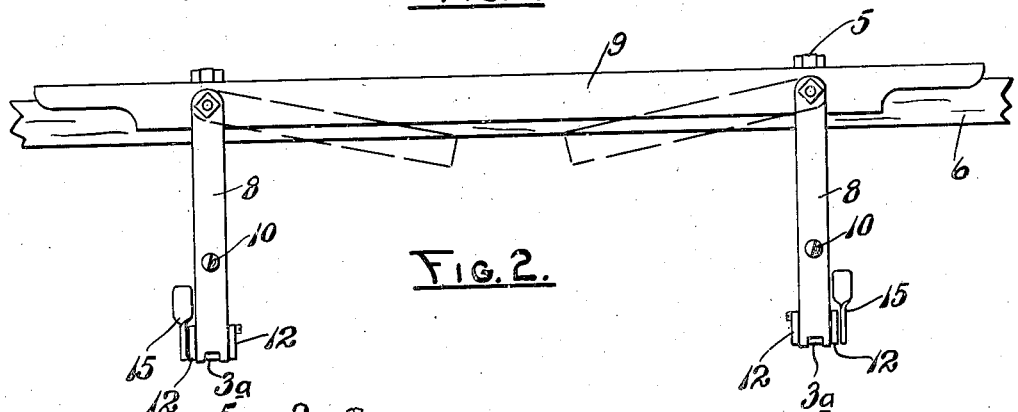
FIG. 2.
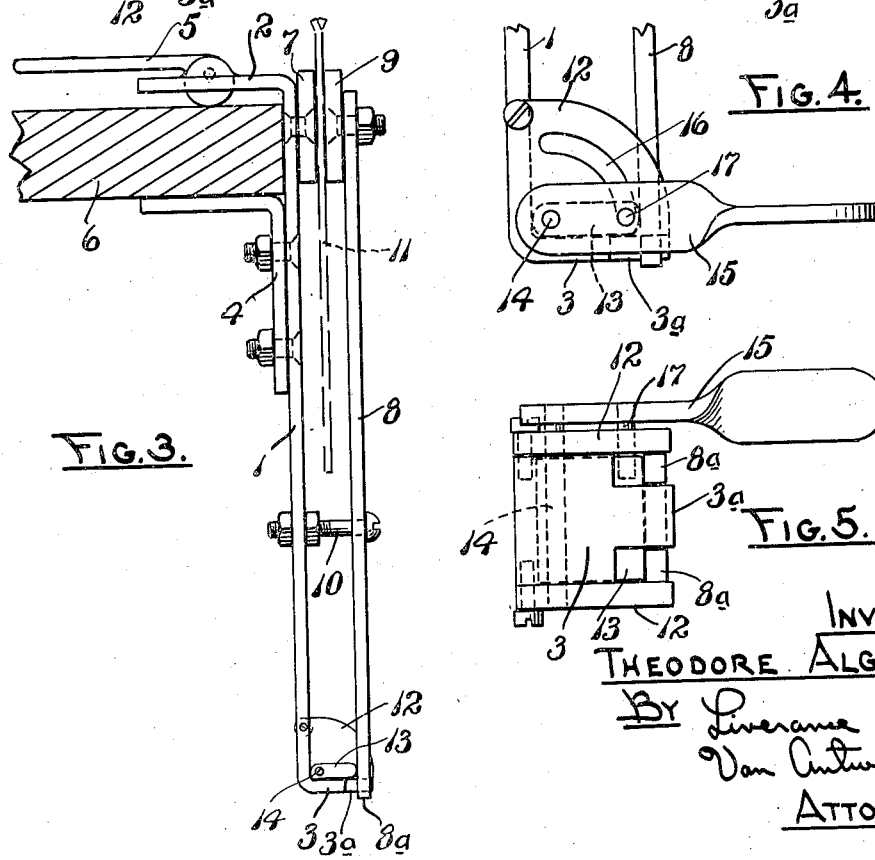
INVENTOR
THEODORE ALGER
BY Liverance and
Van Antwerp
ATTORNEYS Patented Aug. 16, 1949

2,479,147

UNITED STATES PATENT OFFICE 2,479,147

SAW CLAMP

Theodore Alger, New London, Iowa

Application March 22, 1948, Serial No. 16,279

2 Claims. (Cl. 76—78).

This invention is directed to a novel structure of saw clamp. In the filing of saws, also in the setting thereof, with my invention the saw is held by the novel clamp which I have produced, in a horizontal position with the teeth at the upper edge of the saw, where they are readily accessible for the processing thereof, either filing or setting the teeth, or both.

It is an object and purpose of the present invention to provide a clamp in which the saw blade may be held with the teeth at the upper edge thereof, and which clamp is provided with means for detachable connection to a supporting bench or table and is quickly and easily operated for release of a saw held thereby, or to clamp the saw against movement. The structure which I have devised is practical and economical to make, and is of a sturdy, durable character.

An understanding of the invention may be had from the following description, taken in connection with the accompanying drawing, in which, Fig. 1 is a plan view of the clamp, showing the same attached at the edge of a top of a bench or table, Fig. 2 is an elevation thereof, Fig. 3 is an end view of the clamp, a fragmentary portion of the table being shown in vertical section, and a part of the clamp setting and releasing means removed from the lower end thereof, Fig. 4 is a fragmentary enlarged elevation of the structure at the lower end of one of the clamping units, two of which are used, illustrating the manually operable means for setting and releasing the clamp, and Fig. 5 is an under plan view thereof.

Like reference characters refer to like parts in the different figures of the drawing.

In the structure of the clamp two manually operable clamp setting and releasing units are provided, which are spaced apart from each other. Each includes a vertical bar 1 which at its upper end terminates in a horizontal section 2 located at right angles to the length of the bar 1, and at its lower end in a shorter horizontal section 3 located at right angles to the length of the bar 1 but extending opposite to the upper horizontal section 2. The horizontal section 3 at its free end is cut away at both sides to provide a centrally disposed tongue 3a, best shown in Fig. 5. At the rear side of the bar 1 an angle bracket 4 is secured which has a horizontal leg spaced from and parallel to the described section 2. The section 2 carries a handle-operated cam member 5, whereby the edge of a top 6 of a bench, table or the like, is insertable between the horizontal arm of the bracket 4 and the section 2. Moving the cam clamping handles 5 in the proper direction will serve to securely connect the two spaced apart units at the edge of the top 6, as shown in Fig. 3. An elongated horizontal clamping jaw 7 is secured at the front side of the vertical bars 1 near their upper end and extends between them in a position to be substantially opposite the edge of the top 6.

With each of the inner or rear bars 1, an outer vertical bar 8 parallel thereto is associated. Between the two bars 8 of the two spaced units, described, a second clamping bar 9 is located and secured at the same level as the clamping jaw 7. The length of the two bars 7 and 9, which provide the clamping jaws, may be varied for different sizes of the saw clamping structures applicable to saws of different lengths. The lower end of each bar 8 is notched centrally to provide two fingers 8a spaced from each other a distance such that the tongue 3a of the section 7 extends between them. The bars 8 are connected to the inner bars 1 between their ends by bolts, such as indicated at 10, so that such bars 8 may have a limited rocking movement about fulcrums provided by the bolts, whereby the outer clamping jaw 9 may be moved toward or away from the inner jaw 7 for the secure clamping or release of a saw, indicated in dash lines at 11, positioned between them; and as indicated, with the saw teeth at the upper edge of the saw.

At the lower ends of the pairs of bars 1 and 8, and at each side thereof, plates 12 of a generally quadrant form are permanently secured to said bars 1 at each side thereof. Between the two plates 12 on each of said units, a flat block 13 is located and is pivotally mounted at its inner end on a rod or shaft 14, extending between the plates 12 as shown. The pivotal rod 14 is at the inner end of the block. Said block may be turned through an arc of substantially ninety degrees from the horizontal position shown in Fig. 3, to a vertical position. In the horizontal position its forward or outer edge bears against the inner side of its associated bar 8 near the lower end thereof, moving the lower end of the bar 8 below the bolt 10 outwardly and the upper end inwardly. When the block 13 is released and moved to a vertical position, its bar 8 is released with a simultaneous release of the clamping jaw 9 so that the saw 11 may be removed.

Each of the pivotal rods 14 at one end is equipped with a handle 15 for manual operation and for turning the actuating blocks 13 between the positions described. Preferably the side plate 12 adjacent the handle 15 is provided with an arcuate slot 16 and a connecting rod from the handle 15 extends through said slot and is permanently secured to the block 13 for securing a more certain and perfect movement of the actuating block 13.

It is evident with the structure described that a saw may be clamped between the relatively long clamping jaw bars 7 and 9 and held while the teeth are being filed or set; and that upon finishing the filing or setting, the saw may be released and removed. The structure may be folded to a small compass, as indicated in dash lines in Fig. 2, upon its removal from the bench or table top 6, by swinging the bars 1 and 8 which depend below the jaw bars 7 and 9 to the position indicated in Fig. 2.

The structure described is of a novel but simple character, readily manufactured with economy, and serves the purposes for which it has been produced in an exceptionally satisfactory manner.

The invention is defined in the appended claims and is to be considered comprehensive of all forms of structure coming within their scope.

I claim:

1. In a structure as described, two spaced units adapted to be positioned vertically, each of said units comprising, an inner vertical bar having a horizontal outwardly extending section at its lower end, an outer vertical bar mounted at its lower end upon said lower extension of the first bar and extending upwardly therefrom, horizontal clamping jaws extending between the inner and the outer bars of each unit and connected thereto adjacent their upper ends, a fulcrum connection between the bars of each unit a distance above their lower ends, manually operable means for forcing the lower ends of said outer bars outwardly to move said clamping jaw carried on the outer bars inwardly toward the other clamping jaw, said horizontal section at the lower end of the first vertical bar having a reduced width at its free end portion and said outer vertical bar having a recess at its lower end into which said reduced end portion is received, and said means for moving said outer vertical bars about their fulcrum connections comprising, a side plate adjacent the lower end of each vertical bar, one at each side thereof, a shaft extending through the plates of each unit, a handle for turning the shaft, and a block on the shaft between the plates swingable with rocking movement of the shaft to bear against the inner side of the lower end portion of its associated outer vertical bar, as specified.

2. A structure as defined in claim 1, one of said side plates having an arcuate slot therein, and a rod connected with the adjacent block toward its outer edge received and movable in said slot.

THEODORE ALGER.

REFERENCES CITED

The following references are of record in the file of this patent:

UNITED STATES PATENTS

| Number | Name | Date |
| --- | --- | --- |
| 339,020 | Seely | Mar. 30, 1886 |
| 513,831 | Seaver | Jan. 30, 1894 |
| 542,819 | Binkerd | July 16, 1895 |
| 571,742 | Binkerd | Nov. 24, 1896 |
| 863,562 | Turner | Aug. 13, 1907 |
| 918,338 | Ljung | Apr. 13, 1909 |
| 997,243 | Daley | July 4, 1911 |
| 1,024,743 | Padrick | Apr. 30, 1912 |
| 1,196,772 | Gaede | Sept. 5, 1916 |
| 1,324,594 | Huggins | Dec. 9, 1919 |
| 1,507,501 | Miller | Sept. 2, 1924 |